J. C. BLEVNEY.
GROMET INSERTING MACHINE.
APPLICATION FILED NOV. 10, 1913.
1,134,507.
Patented Apr. 6, 1915.
6 SHEETS—SHEET 1.
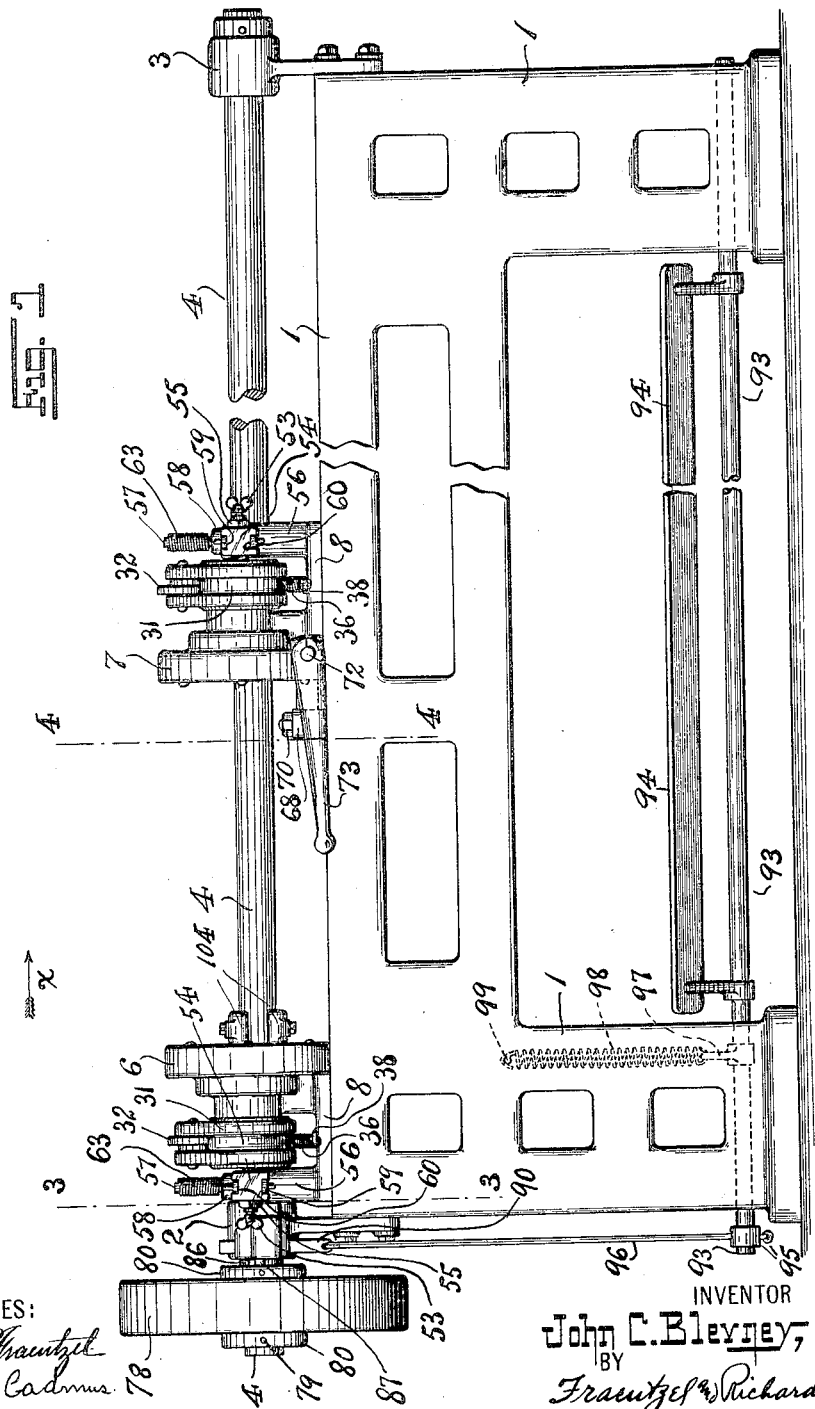
WITNESSES:
INVENTOR
John C. Blevney,
BY
Frautzel & Richards,
ATTORNEYS

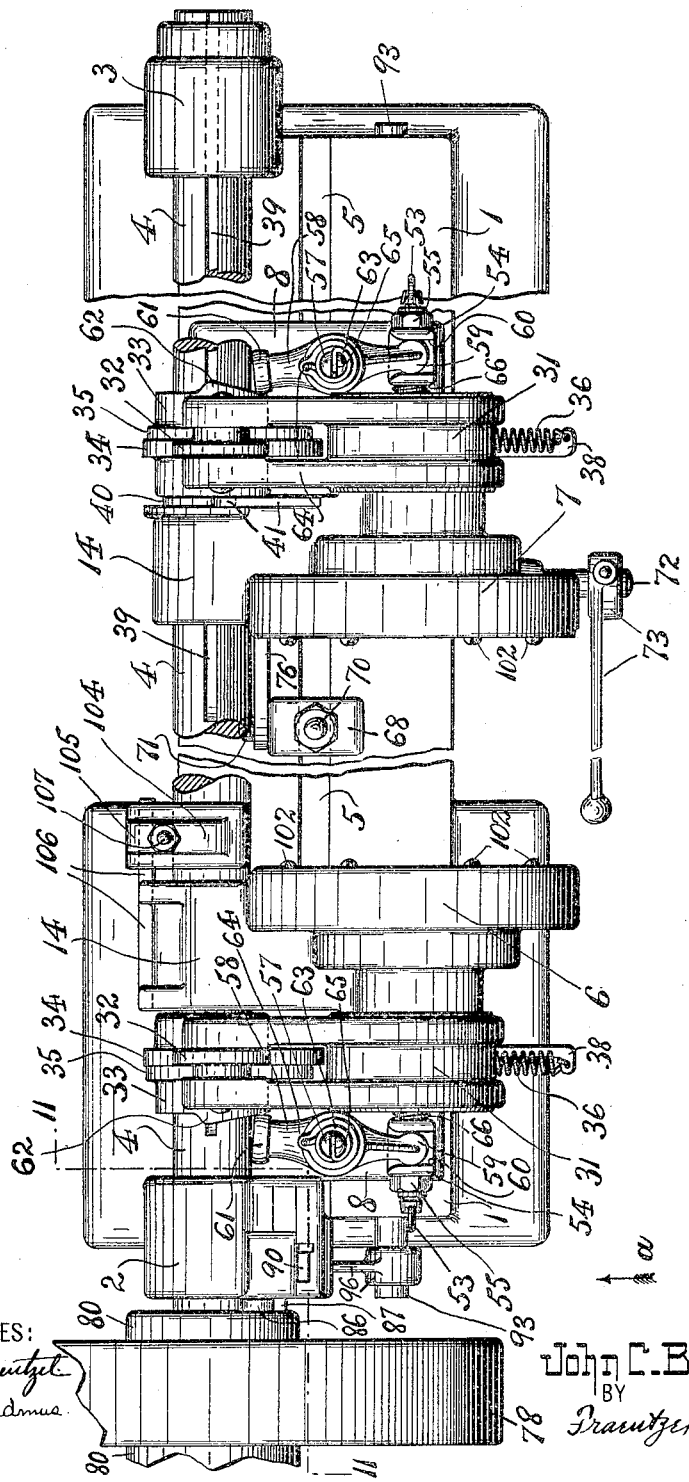

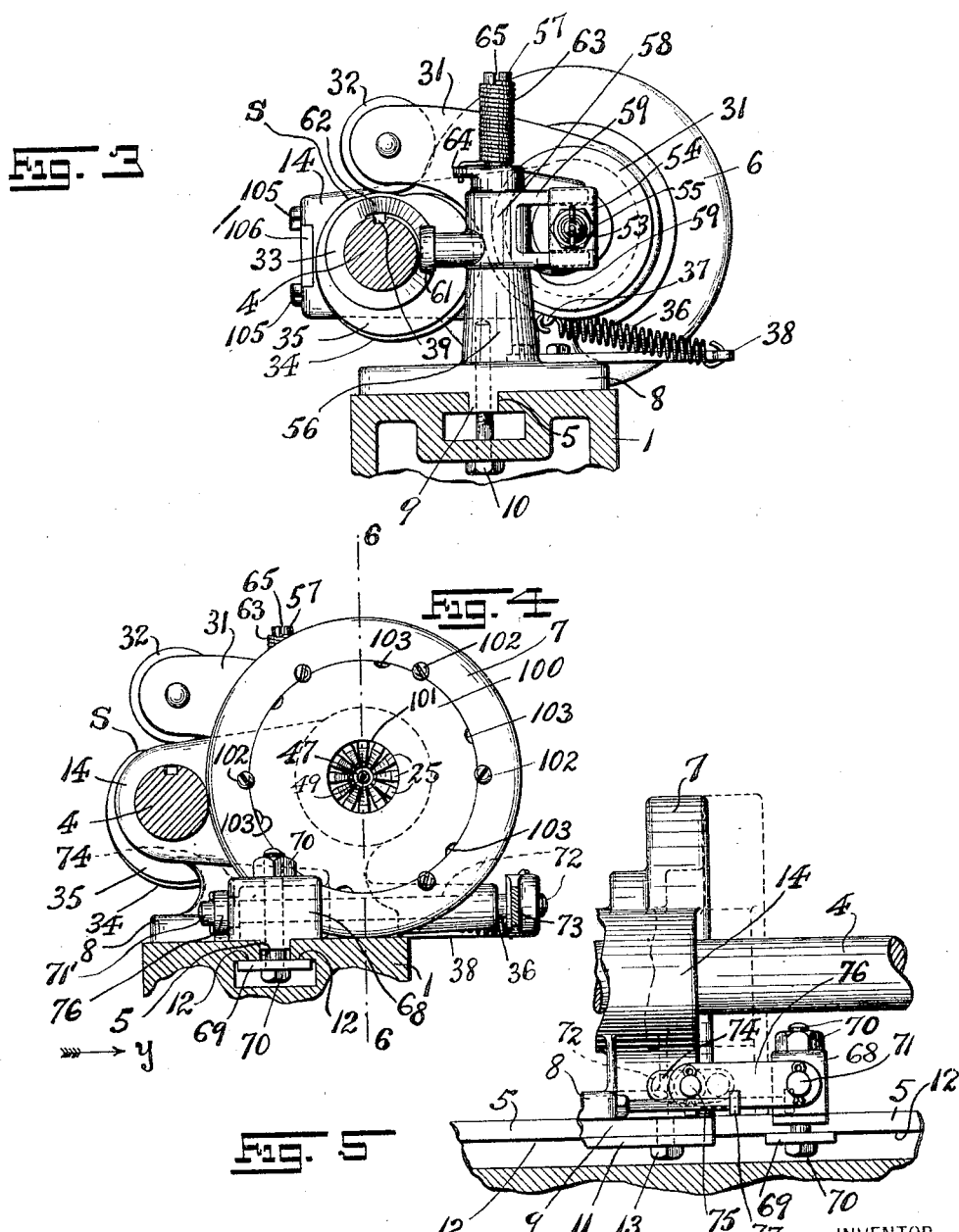

J. C. BLEVNEY.
GROMET INSERTING MACHINE.
APPLICATION FILED NOV. 10, 1913.
1,134,507.
Patented Apr. 6, 1915.
6 SHEETS—SHEET 4.
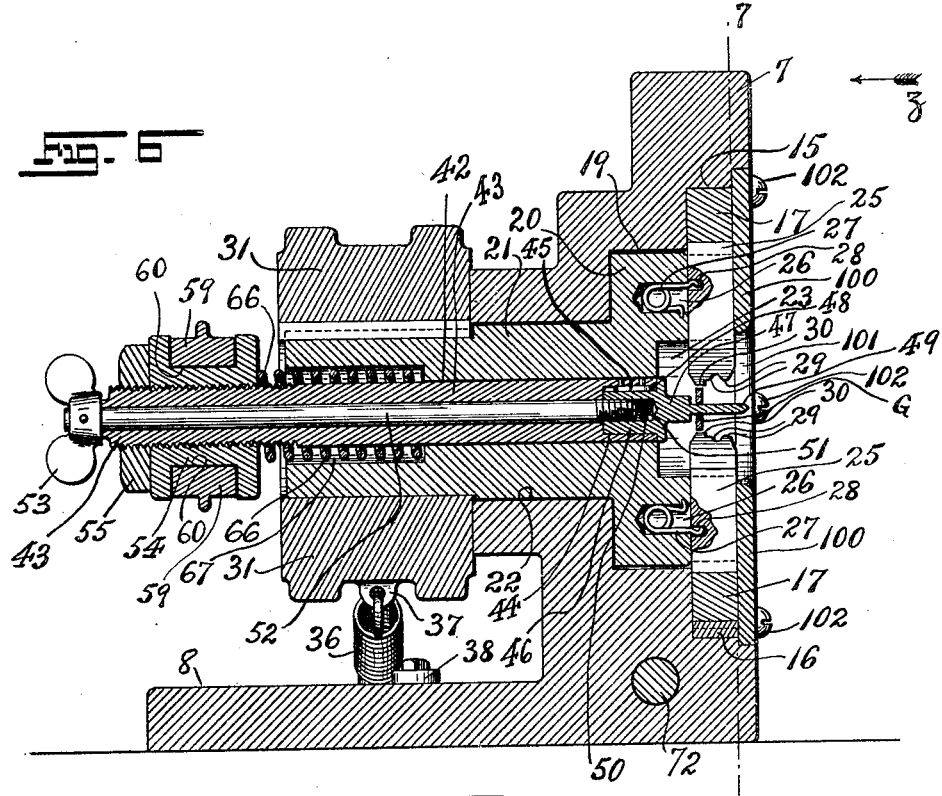
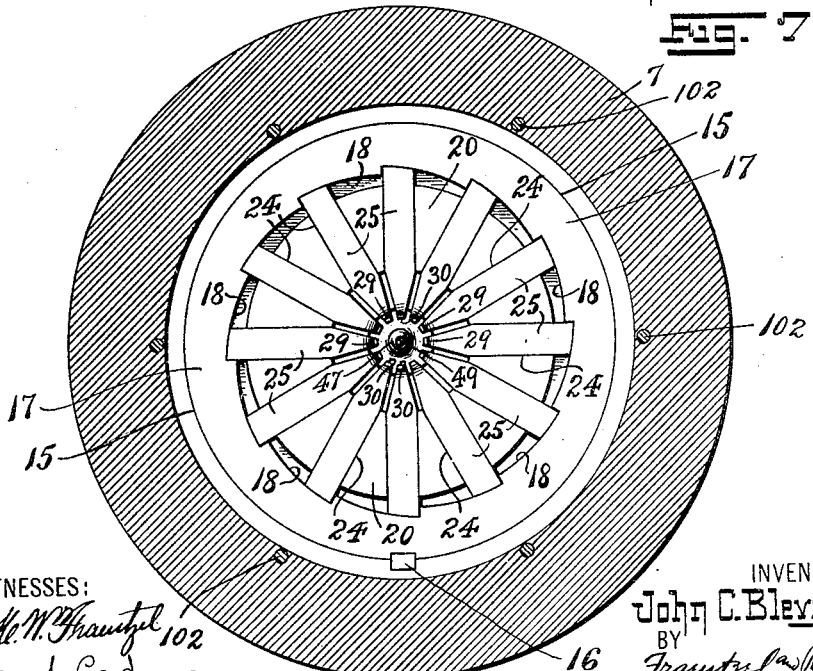
WITNESSES:
INVENTOR
John C. Blevney,
BY
ATTORNEYS

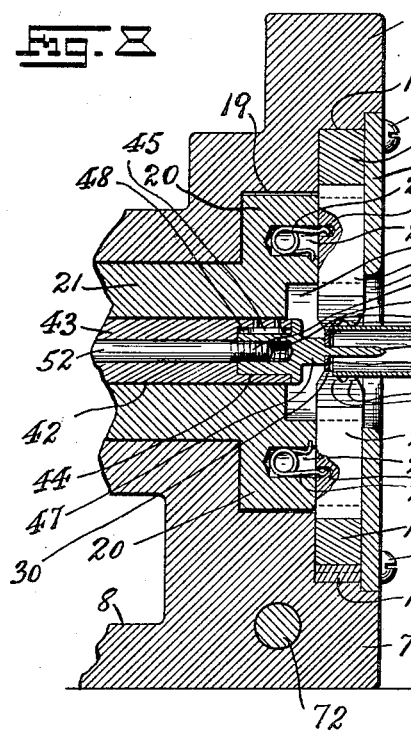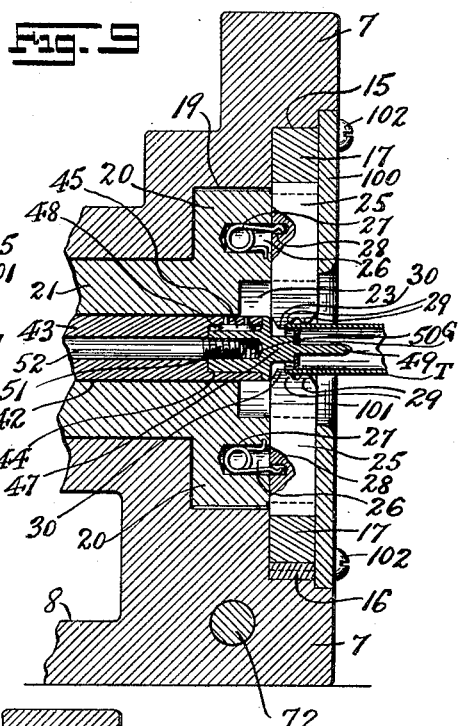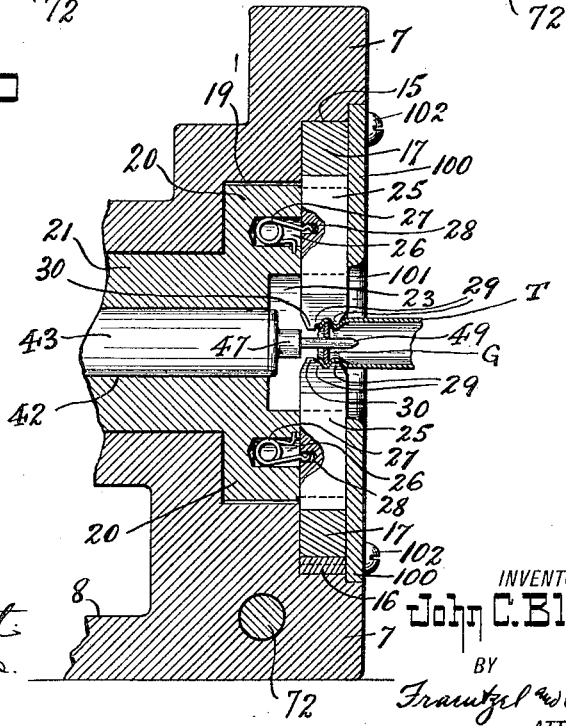

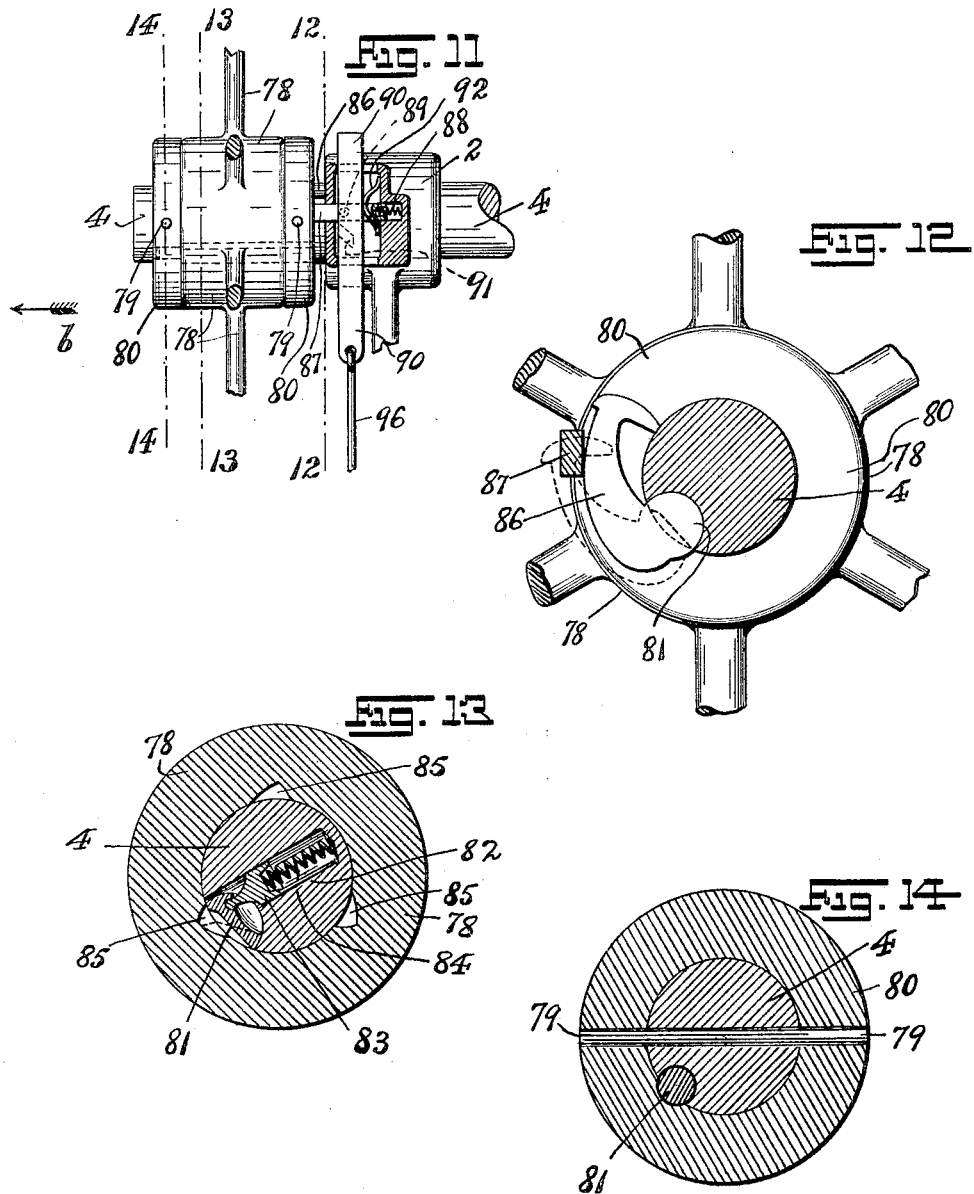

UNITED STATES PATENT OFFICE.

JOHN C. BLEVNEY, OF NEWARK, NEW JERSEY.

GROMET-INSERTING MACHINE.

1,134,507.                    Specification of Letters Patent.         Patented Apr. 6, 1915.

Application filed November 10, 1913.   Serial No. 800,046.

*To all whom it may concern:*

Be it known that I, JOHN C. BLEVNEY, a citizen of the United States, residing at Newark, in the county of Essex and State of New Jersey, have invented certain new and useful Improvements in Gromet-Inserting Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in gromet-inserting machinery; and the present invention has for its principal object to provide an efficient, quickly and easily operated mechanism of simple construction adapted to insert within the ends of hollow rods or tubes, of any desirable cross sectional configuration, and securely fasten therein gromets desired to be associated therewith.

The present invention provides an automatic machine which is particularly adapted for use in the manufacture of metal beds and furniture which are composed of a number of hollow rods or tubes assembled together to produce the bed or furniture parts. The gromets are inserted and fastened within the ends of said tubes to close and stiffen the ends of the same, and to afford means for receiving the fastening devices, such as screws and the like, whereby the said tubes are secured together in their assembled relation. Heretofore the methods and means for thus inserting gromets in such tubes have been crude and unsatisfactory, embracing both hand and machine operations requiring much time and the employment of many skilled workmen making the operation comparatively expensive, and yet resulting in very unsatisfactory finished work. The problem has been to do this class of work quickly, cheaply and accurately, and as far as possible automatically, thereby obviating the necessity of skilled labor, and the consumption of time which so increased the expense of the operation. The present invention provides a mechanism which solves this problem, and which easily, quickly and accurately inserts and secures the gromets in both ends of the tube at once without unequally bulging the ends of the tube, and without fracturing or breaking the same, or otherwise weakening its structure, at the same time assuring a proper accurate setting, and permanent fastening of the gromet so that the same extends properly at right angles to the axis of the tube. The said machine being so constructed that it operates automatically to produce these results, being of such ease and simplicity of operation that unskilled labor or boys may easily feed and operate the same.

The various specific objects of the present invention not at this time more particularly enumerated will be clearly understood from the following detailed description of this invention.

With the objects of the present invention in view, the said invention consists, primarily, in the novel gromet-inserting machine hereinafter set forth; and the invention consists, furthermore, in the novel arrangements and combinations of the several devices and parts, as well as in the details of the construction of the same, all of which will be more fully described in detail in the following specification, and then finally embodied in the clauses of the claim which are appended to and which form an essential part of the said specification.

The invention is clearly illustrated in the accompanying drawings, in which:—

Figure 1 is a side elevation of the novel gromet-inserting machine made according to and embodying the principles of the present invention. Fig. 2 is a plan view of the same drawn upon an enlarged scale, with portions of the supporting frame-work broken away so as to bring within the limits of the figure the essential working parts of the machine. Fig. 3 is a detail cross section taken on line 3—3 in said Fig. 1 looking in the direction of the arrow $x$. Fig. 4 is another detail cross section taken on line 4—4 in said Fig. 1, also looking in the direction of the arrow $x$. Fig. 5 is a detail rear-side view of the right die-head of the machine, the bed or frame-work upon which the same is mounted being shown in section. Fig. 6 is an enlarged detail longitudinal section of said right die-head, taken on line 6—6 in said Fig. 4 looking in the direction of the arrow $y$. Fig. 7 is a transverse section of said right die-head taken on line 7—7 in said Fig. 6, looking in the direction of the arrow $z$. Figs. 8, 9 and 10 are detail views similar to that shown in Fig. 6, but each showing the internal working parts of said die-head performing one of the several stages of the gromet inserting operation. Fig. 11 is a detail longitudinal section of certain parts of the power transmission mechanism of the machine, said section being taken on line 11—11 in said Fig. 2 looking in the direction of the arrow *a*. Fig. 12 is an enlarged transverse section of the same taken on line 12—12 in said Fig. 11; Fig. 13 is another transverse section on the same taken on line 13—13 in said Fig. 11; and Fig. 14 is still another transverse section of the same taken on line 14—14 in said Fig. 11; the view point of all of said views being in the direction of the arrow *b*.

Similar characters of reference are employed in all of the above described views to indicate corresponding parts.

Referring now to the several figures of the drawings, the reference character 1 indicates a suitable frame-work or base upon which are mounted the operating parts of the novel gromet-inserting machine. Suitably secured at each end of said frame-work or base 1, in proper locations, are the left bearing-bracket 2 and the right bearing-bracket 3, in which is journaled a longitudinally extending driving shaft 4. The upper supporting surface of said frame-work or base 1 is provided with a longitudinally extending groove or channel 5. Mounted upon said supporting surface of said frame-work or base 1 are a left die-head 6 and a right die-head 7. Since the internal structure and detail parts of both said left die-head and right die-head are the same, the same reference letters will be employed to indicate said parts, so that a description of one die-head will suffice for both. Where, however, there are differences or additions in their construction the same will be pointed out and described. Each die-head is provided with a base-plate 8 having upon its under side a longitudinal rib or guide 9 which enters said groove or channel 5 of said frame-work or base 1 so as to maintain the same in proper alinement thereon. The said left die-head 6 is secured in a fixed or stationary position at the left end of the frame-work or base by means of a bolt 10, or any other suitable fastening means. The right die-head is arranged to be movable longitudinally upon said frame-work or base, and is maintained against lifting or jumping up from the supporting surface of the frame-work or base by means of a keeper-plate 11 which engages the undercut portions 12 of said channel or groove 5, and which is secured to said right die-head by means of a bolt 13, or other suitable fastening means. Each die-head is provided with a bearing-arm 14 through which extends said driving-shaft 4.

Each die-head is provided in its face with an annular chamber or recess 15 in which is securely fixed against movement, by means of a key 16, a cam-ring 17, provided upon its inner periphery with a series of cam-surfaces 18. Extending rearwardly from said annular chamber or recess 15 is another chamber or recess 19 of smaller diameter in which is rotatably mounted a die-carrier 20, the hub portion 21 of which extends rearwardly through the opening 22 at the rear end of said die-head. Said die-carrier is provided in its face with a centrally disposed recess 23 from which radiate a series of grooves 24. Slidably mounted in said grooves 24 are a series of crimping-die members 25, the outer ends of which are maintained in contact with said cam-surfaces 18 of said cam-ring 17. Formed in said die-carrier 20, so as to communicate with the bottom of each of said radiating grooves 24, are a series of spring-sockets 26 in which are arranged U-shaped spring members 27, one arm of each spring-member entering a receiving recess 28 in the back of each crimping-die member 25, the tension of said spring-members tending to maintain the die-members in contact with said cam-surfaces 18 of the cam-ring 17. The said crimping-die members as thus mounted tend to converge toward the center or axis of said die-carrier. The inner ends of said die-members 25 are formed with the crimping points 29 to the rearward of which are stop projections 30. A keeper-plate 100 provided with a centrally disposed opening 101 is arranged with each die-head so as to cover the body of said die-members 25 to prevent the same from springing away from their operative relation to said die-carrier 20 and said cam-ring 17. The periphery of said keeper-plate 101 is engaged by the heads of retaining screws 102 whereby the same is secured in place. When it is desired to remove said keeper-plate 101 the same is turned to register the notches or cutaway portions 103, with which its periphery is provided, so that the same may be removed past said screw-heads. Secured upon the rearwardly projecting hub-portion 21 of said die-carrier 20 is a lever-arm 31, the free end of which is forked so that an anti-friction roller 32 may be journaled therein.

Mounted upon said driving-shaft 4 is a cam-member 33 provided with a pair of cam-portions 34 and 35, the former of which is of greater pitch than the latter. Said anti-friction roller 32 is of sufficient width to engage but one of said cam-portions at a time. As shown in the drawings said anti-friction roller engages operatively the cam-portion 34 having the larger pitch, hence when the machine is in operation, said cam-portion 34 gives a maximum throw to said lever-arm 31, thereby turning said die-carrier 20 to carry said crimping die-members 25 farther along on the cam-surfaces 18 of the cam-ring 17, thereby causing said die-members 25 to move inwardly to the maximum distance of their stroke whereby a deep crimp is formed in a tube about the edges of a gromet inserted therein, in a manner to be subsequently more fully described. When, however, a lighter or shorter crimping stroke of the die-members is desired, said anti-friction roller is journaled in connection with said lever-arm 31 in a reversed position so as to ride upon or engage the cam-portion 35 which is of smaller throw, whereby the throw or movement of the lever-arm 31 and die-carrier 20 is decreased, and consequently the inward stroke of the die-members 25 is also decreased so that a lighter crimping contact with the tube operated upon will result, all of which will be evident from an inspection of the accompanying drawings. Said lever arms and their anti-friction rollers are maintained in proper operative contact with the cam-members by means of a coil-spring 36 which is secured by one end to an eye-piece 37 formed on said lever-arm 31, and by its other end to an anchor-arm 38 suitably secured to the base-plates 8 of the respective die-heads.

The cam-member operating the lever-arm associated with the left die-head 6 is keyed to said driving-shaft 4 in a fixed position thereon, but while the cam-member operating the lever-arm associated with the right die-head 7, is secured with a key so as to turn with said driving shaft, the said key is slidably associated with a longitudinal spline or groove 39 in said driving-shaft 4, so that said cam-member may follow said right die-head 7 when the latter is moved longitudinally upon the base or frame-work for adjustment purposes. In order to assure the proper operatively related position of said cam-member with said right die-head 7, the former is provided in its hub with an annular groove 40 which is engaged by a keeper-plate 41, the latter being suitably secured to some portion of said right die-head 7.

Said die-carrier 20 and its hub-portion 21 is provided with a centrally disposed longitudinal opening 42 in which is slidably arranged a gromet-inserting plunger 43. The said plunger 43 is provided at its inner end with a receiving socket 44, having arranged at one side thereof a key 45. Inserted in said receiving socket 44 is the shank portion 46 of a plunger-head 47, said shank-portion 46 having at one side a groove or spline 48 in which said key 45 enters, thereby preventing said plunger-head 47 from turning. Extending outwardly from said plunger-head 47 is a center-pin 49. The said shank-portion of said plunger-head is further provided with an internally screw-threaded opening 50 in its rear end adapted to receive the screw-threaded shank 51 of a locking rod 52, which extends longitudinally through an opening in said plunger 43. The outwardly projecting free end of said rod 52 is provided with a finger-grip 53 for turning the same to engage the screw-threaded shank 51 with said opening 50, thereby locking said plunger head in operative relation to the plunger, in a manner clearly to be understood from an inspection of Fig. 6 of the accompanying drawings. The rearwardly projecting free end of said plunger 43 is screw-threaded to receive a push-block 54, which is thus adjustably connected therewith, the said push-block 54 being locked in its adjusted position by means of a lock-nut 55, or any other suitable holding means.

Extending upwardly from the base-plate 8 of each die-head is a post 56, which supports a vertical stud or journal 57. Pivotally mounted upon said stud or journal 57 is a lever-member 58, one end of which is bifurcated to form engaging arms 59 adapted to enter and be operatively associated with the receiving recesses or grooves 60 with which the upper and lower sides of said push-block 54 is provided. The other end of said lever-member 58 is provided with an anti-friction roller 61 which rides in contact with a lateral cam-portion 62 with which said cam-members 33 are each provided. Said lever-member is controlled so as to maintain said anti-friction roller 61 in riding contact with said cam-portion 62 by means of a coil-spring 63, which encircles the upper end of said journal or stud 57. One end of said spring 63 engages an eye-piece 64 formed on the hub of said lever-member, and the other end of said spring is anchored in a cross-cut or groove 65 in the upper end of said journal or stud 57. Said lever-member, as operated by said cam-portion 62, tends to move said plunger 43 inward, causing the same to perform the gromet inserting operation, as will be subsequently described. The return movement of said plunger is aided by a coil-spring 66, which encircles said plunger 43 within an enlarged recess 67 at the rear end of the hub-portion 21 of said die-carrier 20, said coil-spring 66 being adapted to push against said push-block 54 to effect the rearward movement of said plunger 43, said coil-spring 66 being auxiliary to the lever-member coil-spring 63 above described.

As will be apparent from an inspection of the drawings the right die-head 7 may be moved longitudinally upon said frame-work or base 1 to adjust the intervening distance between the same and the left die-head 6, so that the operation of the die-head mechanisms may be effected upon different lengths of tubes. In addition to this general adjusting movement of said die-head 7, the same is also capable of a controlled limited longitudinal movement effected by the following means in the following manner, and for the subsequently described purposes. The said means comprises an anchor-block 68 which is clamped in a fixed position upon said frame-work or base 1 by means of the keeper-plate 69 and bolt 70. Extending outwardly from one side of said anchor-block 68 is a stud 71. Extending transversely through said die-head 7, so as to be journaled in the lower part thereof, is a transverse shaft 72, the same being provided at one end with a hand-lever 73 for oscillating said shaft. The other end of said shaft 72 is provided with a crank-arm 74 provided with a stud 75. Said stud 75 of said crank-arm, and said stud 71 of said anchor-block 68, are operatively connected together by means of a connecting-link 76. Connected with the base 8 of said die-head 7 is an adjustable gage-stop 77. By oscillating said shaft 72 in one direction its crank-arm 74 serves to move rearwardly away from said fixed anchor-block 68 said die-head 7, and thereby tends to separate said die-head 7 from its normal operative position with relation to said die-head 6. When in such a position the adjustable gage-stop 77 is distanced from the forward edge of the base 8 of said die-head 6 sufficiently to equal the length of the tube to be operated upon. In other words the distance between the gage-stop and the base 8 of the die-head 6 is equal to the distance between the stop-projections of the die-members 25 of the respective die-heads when the same are moved into operative relation with the respective ends of the tube to be operated upon. If the fixed position of the anchor-block 68, and the die-head 7 as controlled thereby, is not such as to permit the distance between the gage-stop and base 8 of the die-head 6 to equal the length of the tube, then the anchor-block 68 and die-head 7 must be shifted upon the frame-work or base to such position as will fulfil this condition. It will thus be seen that the real purpose of said gage-stop is to serve as a guide for properly adjusting the intervening distance between the respective die-heads in accordance with the length of tube to be operated upon. Once this adjustment is effected a succession of tubes of corresponding length may be operated upon. The tube is inserted by one end within the die-head 6, and the other end of the tube is held in registration with the opening of the die-head 7, and then by oscillating the hand-lever 73 in the opposite direction, the crank-arm of the shaft 72 is turned in such a manner as to draw said die-head 7 toward the anchor-block 68, and toward the die-head 6, whereby the other end of the tube is caused to enter said die-head 7, so that said tube ends respectively engage the stop-projections of the die-members 25 of the respective die-heads, and the machine is ready for operation. All of which is illustrated in Fig. 5 of the accompanying drawings.

It is desirable that the driving-shaft 4 should make but one revolution at a time, since that one revolution will rotate the operating cam-members connected therewith once, which is sufficient to operate the single crimping stroke of the die-members 25. To this end there is provided a means for starting the rotation of the shaft and automatically stopping the same at the end of a single revolution, so that the finished tube may be removed and another tube and grommets therefor may be inserted in the die-heads. This means comprises a driving-pulley 78 which is loosely mounted on one end of said driving-shaft 4. Fixed upon said driving-shaft by means of pins 79, and located one on each side of the hub of said driving-pulley 78, are a pair of collars 80. Journaled by its ends in said collars 80, and in cut away portions of the shaft 4 adapted to receive the same, is an oscillating-key 81. Said shaft 4 is also provided in a suitable location with a transverse bore or socket 82 in which is slidably mounted a plunger 83, actuated by a coil-spring 84 which maintains said plunger 83 in contact with said oscillating-key 81, in such a manner as to tend to press said oscillating-key 81 outward and into engagement with one of a series of key-ways 85 with which the bore of said hub of the driving-pulley is provided. Connected with one end of said oscillating-key 81 is a lever-arm 86. Slidably mounted in a portion of said left-bearing-bracket 2 is a stop-bolt 87, the same being thrust outward in the path of said lever-arm 86 by means of a spring 88. Said bolt 87 is provided on one side with a stud or pin 89. Also associated with said left bearing bracket 2 is a vertically movable cam-plate 90 provided upon one side with an incline cam-projection 91. Said cam-plate 90 is also capable of a lateral movement against the tension of a spring-member 92. Mounted in the lower portion of said frame-work or base 1 is a longitudinally extending rock-shaft 93 provided with a foot-treadle attachment 94 for oscillating the same in one direction. Connected with said rock-shaft 93 is a lever 95, and connecting said cam-plate 90 with the free end of said lever 95 is a connecting-rod 96, whereby the movement of said rock-shaft and lever is transmitted to said cam-plate. Connected with said rock-shaft is another lever 97 to the free end of which is secured a coil-spring 98, the other end of which is secured to a suitable anchor point 99 connected with said frame-work or base 1, said coil-spring tending to return said rock-shaft, cam-plate and foot-treadle to normal initial position after operation.

The operation of the driving-shaft mechanism immediately above described is as follows:—The operator presses downward with his foot the foot-treadle 94 thereby oscillating the rock-shaft 93 and the lever 95 to swing the latter upward, and to move upwardly the cam-plate 90 through the medium of the connecting-rod 96. This upward movement of the cam-plate carries its cam-projection 91 into contact with the stud or pin 89 of the bolt 87, and the inclined surface of said cam-projection traveling along said pin or stud 89 causes the bolt 87 to be withdrawn, against the tension of its spring 88, from contact with said lever-arm 86 of said oscillating-key 81. Said lever-arm being thus freed from the obstruction of said bolt against its outwardly swinging movement permits the spring 84 and plunger 83 to oscillate said oscillating-key 81, so that as the driving-pulley 78, which is constantly rotated by a belt or other power transmission device driven from the source of power, rotates one of its key-ways 85 is presented in alinement with said oscillating-key 81, whereby the latter enters the former, and thus immediately couples said driving-shaft 4 in driven relation to said driving-pulley. The driving-shaft 4 now rotates and said lever-arm 86 of the oscillating-key 81 travels around with it. In the meantime the cam-plate 90 has moved upward far enough to carry away its cam-projection 91 from contact with the pin or stud of said bolt 87, consequently the bolt 87 is impelled back to its normal position by its spring 88, said normal position being in the path of said lever-arm 86 of the oscillating-key 81. As said lever-arm 86 rides around with the driving-shaft 4 it is again carried into contact with said bolt 87, and the continued movement of the shaft 4 carries the lever-arm 86 along said bolt 87 in such a manner that said lever-arm is swung back to its normal position at the end of one revolution of the shaft 4, and consequently the oscillating-key 81 is oscillated in an opposite direction which withdraws the same from the key-way 85 of the driving-pulley 78, and the shaft again remains stationary while the driving-pulley continues its rotation. In this manner the operating cam-members connected with said driving-shaft are given but one operative rotation at a time. When the operator removes his foot from the foot-treadle the coil-spring 98 returns the operating means of said cam-plate 90 to normal initial position, consequently drawing downward again said cam-plate 90 to its normal initial position. As the said cam-plate 90 moves downwardly the opposite side of its cam-projection 91 engages said pin or stud 89, but said bolt being in its outwardly thrust position and at the limit of its outward movement it causes the pin or stud 89 to remain immovable so that the cam-projection 91 in riding past the same causes the cam-plate 90 to yield laterally against the tension of the spring 92, so that the same will pass the pin or stud and resume its normal initial position. All of the above described operations will be clearly understood from an inspection of Figs. 11 to 14 inclusive of the accompanying drawings.

In order to assure a control of the momentum of the shaft 4 when driven, so that the same may be more easily brought to rest after completing its single revolution, there is provided a momentum brake device, comprising a pair of brake-jaws 104 which straddle said driving shaft 4, and the tail pieces 105 of which are supported by a bracket-plate 106 preferably connected with some convenient portion of the die-head 6. A bolt 107 which connects the two brake-jaws together passes downwardly between said bracket-plate 106 and the shaft 4, thus serving to clamp the said brake-jaws in connection both with said bracket-plate and shaft, and also serving to regulate the braking pressure of said brake-jaws upon said shaft 4. It will of course be understood that said brake-jaws may be fitted with any desirable arrangement, kind or construction of brake-shoes for immediately contacting with said shaft 4.

In the use of the machine a gromet G is placed upon the center-pin 49 of the plunger-head 47 of each die-head in the manner shown in Fig. 6, and then a tube T is inserted by its ends in the respective die-heads and in engagement with the stop-projections of the crimping-die members 25. The machine is now ready for operation. The driving-shaft 4 is then rotated in the manner above described. It will be noticed by inspecting Fig. 3 of the drawings that there is a step-up S in the cam-portions 34 and 35 which gives a preliminary movement of the lever-arms 31 which causes a slight-movement of the die-carrier 20 and thereby causes the ends of the stop-projections of said die-members 25 to close down upon the perimeter of the gromet G to center the same in the manner shown in Fig. 8 of the drawings. This movement takes place before the lateral cam-portion 62 of the cam-members begins to act upon the plunger operating lever-member 58. The next operation occurring during the rotation of said cam-members is the operation of said plunger operating lever-member 58 to push upwardly said plunger and plunger-head 47 to insert said gromets within the ends of the tube, and properly registered with relation to the crimping-points of the die-members 25, as shown in Fig. 9 of the drawings. This operation completed the end of the lateral cam-portion 62 is reached and passed so that the lever-member 58 is permitted to return to normal position, and said plunger and plunger-head is withdrawn leaving the gromets in place within the tube ends. Now the main portion of the cam-portions 34 or 35 operate upon the lever-arms 31 to move them to their complete limit of movement whereby the die-carrier is oscillated to carry said die-members into completed operating contact with said cam-ring 17, whereby the former are caused to make their crimping stroke, and are thereby pressed against the exterior sides of the tube T so that their crimping points will crimp or otherwise form the pressed in portions of the tube body on each side of the gromet, whereby the latter is securely and rigidly fastened within the tube end. Subsequently the shaft 4 completes its revolution and all parts of the mechanism return to normal positions. The gromet fitted tube may then be removed and the operations repeated.

Of course it will be understood that the crimping die-members 25 are interchangeable, and they are supplied in sets having their bodies of greater or less length according to the diameter of the tubes operated upon. It will also be understood that the die-points themselves may be made in various forms to produce various crimping or beading indentations in the tubes, and also the gromets may be made in various forms, either with plain peripheries, or star shaped, or indented, or in other desirable forms. The plunger-head 47 may also be modified to conform the same to perforated, blank, or notched gromets, according to desire.

As many changes may be made in the above described construction of my invention and its detail parts, and many apparently widely different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all generic and specific features of the invention herein described and all statements of the scope of the invention, which, as a matter of language, might be said to fall therebetween. Hence, I do not limit my present invention to the exact arrangements and combinations of the devices and parts as described in the said specification, nor do I confine myself to the exact details of the construction of the said parts, as illustrated in the accompanying drawings.

I claim:—

1. In a device of the class described, a die-head, a cam-ring in said die-head, a die-carrier rotatably mounted in said die-head, a series of crimping die-members carried by said die-carrier in operative engagement with said cam-ring, means for operating said die-carrier, a plunger mechanism associated with said die-carrier and die-head for inserting a gromet in a tube, means on the end of said plunger for supporting a gromet in operative relation thereto, and means for operating said plunger mechanism.

2. In a device of the class described, a die-head, a fixed cam-ring in said die head, said cam-ring having a series of cam-surfaces, a die-carrier mounted to oscillate in said die-head, a series of crimping die-members slidably mounted upon said die-carrier and disposed radially to the axis of said die-carrier and the tube to be operated upon, the outer ends of said die-members being slidably related to the cam-surfaces of said cam-rings, spring-means carried by said die-carrier and associated with said die-members to maintain said die-members in operative contact with said cam-ring, means for oscillating said die-carrier, a plunger-mechanism associated with said die-carrier and die-head for inserting gromets in a tube, and means for operating said plunger.

3. In a device of the class described, a pair of oppositely facing die-heads, a cam-ring in each die-head, a die-carrier rotatably mounted in each die-head, a series of crimping die-members carried by said die-carrier in operative engagement with said cam-ring, a lever-arm connected with each die-carrier, a driving shaft, cam-members provided with circumferential cam-portions mounted on said driving-shaft and operatively engaging said lever-arms, a plunger mechanism associated with each of said die-carriers and die-heads for inserting gromets in a tube, and means for operating said plunger mechanism.

4. In a device of the class described, a die-head, a crimping mechanism mounted in said die-head, a driving shaft, a cam-member provided with a circumferential cam-portion mounted on said driving-shaft adapted to operate said crimping die-mechanism, a plunger mechanism associated with said die-head for inserting gromets in a tube, and means for operating said plunger mechanism, comprising a pivotally mounted lever-member one end of which is operatively connected with said plunger-mechanism, and a lateral cam-portion connected with said cam-member of said driving-shaft and adapted to operatively engage the other end of said lever-member to oscillate the same whereby said plunger-mechanism is reciprocated.

5. In a device of the class described, a die-head, a crimping die mechanism mounted in said die-head, a driving shaft, transmission mechanism between said driving shaft and said crimping die-mechanism for operating the latter, means for inserting a gromet in a tube, and means for automatically limiting the driven rotation of said driving shaft to one revolution at a time.

6. In a device of the class described, a frame-work, a pair of oppositely facing die-heads, one of said die-heads being secured to said frame-work in a fixed position, the other of said die-heads being adjustable upon said frame-work with reference to its distance from said fixed die-head, means connected with said adjustable die-head for imparting thereto a limited backward and forward movement after the same has been secured in its primarily adjusted position, a crimping die mechanism in each die-head, a driving shaft, and transmission mechanism between said driving shaft and each crimping die-mechanism for operating the latter.

7. In a device of the class described, a die-head, a fixed cam-ring in said die-head, said cam-ring having a series of cam-surfaces, a die-carrier mounted to oscillate in said die-head, a series of crimping die-members slidably mounted upon said die-carrier and disposed radially to the axis of said die-carrier and the tube to be operated upon, the outer ends of said die-members being slidably related to the cam-surfaces of said cam-ring, spring means carried by said die-carrier and associated with said die-members to maintain said die-members in operative contact with said cam-ring, the converging ends of said die-members having crimping points and being further provided with stop-projections to the rear of said crimping points adapted to engage the tube to be operated upon to position its end with relation to said crimping points, means for oscillating said die-carrier, and means associated with said die-carrier and die-head for inserting a gromet within the tube end in proper position relative to said crimping points of said die-members.

8. In a device of the class described, a die-head, a crimping die mechanism in said die-head, means associated with said die-head and its crimping die mechanism for inserting a gromet within the tube and in proper position relative to said crimping die mechanism, said means comprising a centrally longitudinally extending plunger, a plunger-head connected with the inner end of said plunger, means for locking said plunger-head in place, means connected with said plunger-head for supporting a gromet, and means for reciprocating said plunger to insert said gromet in the tube before the operation of said crimping die mechanism.

9. In a device of the kind described, a die-head, a fixed cam-ring in said die-head, said cam-ring having a series of cam-surfaces, a die-carrier mounted to oscillate in said die-head, a series of crimping die-members slidably mounted upon said die-carrier and disposed radially to the axis of said die-carrier and the tube to be operated upon, the outer ends of said die-members being slidably related to the cam-surface of said cam-ring, spring means carried by said die-carrier and associated with said die-members to maintain said die-members in operative contact with said cam-ring, the converging ends of said die-members having crimping-points and being further provided with stop-projections to the rear of said crimping points adapted to engage the tube to be operated upon to position its end with relation to said crimping-points, a lever-arm connected with said die-carrier, a driving-shaft, a cam-member provided with a circumferential cam-portion mounted on said driving-shaft and operatively engaging said lever-arm, and means associated with said die-carrier and die-head for inserting a gromet within the tube end in proper position relative to said crimping-points of said die-members.

10. In a device of the kind described, a die-head, a fixed cam-ring in said die-head, said cam-ring having a series of cam-surfaces, a die-carrier mounted to oscillate in said die-head, a series of crimping die-members slidably mounted upon said die-carrier and disposed radially to the axis of said die-carrier and the tube to be operated upon, the outer ends of said die-members being slidably related to the cam-surfaces of said cam-ring, spring means carried by said die-carrier and associated with said die-members to maintain said die-members in operative contact with said cam-ring, the converging ends of said die-members having crimping-points, and being further provided with stop-projections to the rear of said crimping points adapted to engage the tube to be operated upon to position its end with relation to said crimping-points, a lever-arm connected with said die-carrier, a driving-shaft, a cam-member provided with a circumferential cam-portion mounted on said driving-shaft and operatively engaging said lever-arm, means associated with said die-carrier and die-head for inserting a gromet within the tube end in proper position relative to said crimping-points of said die-members, and means for automatically limiting the driven rotation of said driving shaft to one revolution at a time.

11. In a device of the class described, a die-head, a fixed cam-ring therein, a die-carrier rotatably associated with said die-head, a series of crimping-die-members carried by said die-carrier in operative engagement with said cam-ring, said die-members being radially disposed upon said die-carrier and capable of a converging movement toward the axis of said die-carrier and a tube to be operated upon, and means for oscillating said die-carrier, comprising a driving-shaft, a cam-member provided with a circumferential cam-portion mounted on said driving-shaft, and a lever-arm secured to said die-carrier so that its free end rides in operative contact with said cam-portion.

12. In a device of the class described, a die-head, a fixed cam-ring therein, a die-carrier rotatably associated with said die-head, a series of crimping die-members carried by said die-carrier in operative engagement with said cam-ring, said die-members being radially disposed upon said die-carrier and capable of a converging movement toward the axis of said die-carrier and a tube to be operated upon, a centrally disposed longitudinally extending plunger slidably connected with said die-carrier, a plunger-head connected with the inner end of said plunger, means connected with said plunger-head for supporting a gromet, means for oscillating said die-carrier to cause the crimping operation of said die-members, and means for reciprocating said plunger in advance of the crimping operation of said die-members.

13. In a device of the class described, a die-head, a fixed cam-ring therein, a die-carrier rotatably associated with said die-head, a series of crimping die-members carried by said die-head in operative engagement with said cam-ring, said die-members being radially disposed upon said die-carrier and capable of a converging movement toward the axis of said die-carrier and a tube to be operated upon, a centrally disposed longitudinally extending plunger slidably connected with said die-carrier, a plunger-head connected with the inner end of said plunger, means connected with said plunger-head for supporting a gromet, a lever-arm connected with said die-carrier, a driving-shaft, a cam-member mounted on said shaft adapted to operatively engage the free end of said lever-arm, and means for reciprocating said plunger in advance of the crimping operation of said die-members.

14. In a device of the class described, a die-head, a fixed cam-ring therein, a die-carrier rotatably associated with said die-head, a series of crimping die-members carried by said die-head in operative engagement with said cam-ring, said die-members being radially disposed upon said die-carrier and capable of a converging movement toward the axis of said die-carrier and a tube to be operated upon, a centrally disposed longitudinally extending plunger slidably connected with said die-carrier, a plunger-head connected with the inner end of said plunger, means connected with said plunger-head for supporting a gromet, a lever-arm connected with said die-carrier, a driving-shaft, a cam-member mounted on said shaft adapted to operatively engage the free end of said lever-arm, and means for reciprocating said plunger in advance of the crimping operation of said die-members, and means for automatically limiting the driven rotation of said driving-shaft to one revolution at a time.

15. In a device of the class described, a die-head, a fixed cam-ring therein, a die-carrier rotatably associated with said die-head, a series of crimping die-members carried by said die-heads in operative engagement with said cam-ring, said die-members being radially disposed upon said die-carrier and capable of a converging movement toward the axis of said die-carrier and a tube to be operated upon, a centrally disposed longitudinally extending plunger slidably connected with said die-carrier, a plunger-head connected with the inner end of said plunger, means connected with said plunger-head for supporting a gromet, a lever-arm connected with said die-carrier, a driving-shaft, a cam-member provided with a circumferential cam-portion adapted to operatively engage the free end of said lever-arm, a pivoted lever-member, one end of said pivoted lever-member being operatively connected with said plunger, and a lateral cam-portion connected with said cam-member of said driving-shaft adapted to operatively engage the opposite end of said lever-member, said lateral cam-portion of said cam-member being so positioned with relation to said circumferential cam-portion of said cam-member that the former operates in advance of the latter.

16. In a device of the class described, a die-head, a fixed cam-ring therein, a die-carrier rotatably associated with said die-head, a series of crimping die-members carried by said die-head in operative engagement with said cam-ring, said die-members being radially disposed upon said die-carrier and capable of a converging movement toward the axis of said die-carrier and a tube to be operated upon, a centrally disposed longitudinally extending plunger slidably connected with said die-carrier, a plunger-head connected with the inner end of said plunger, means connected with said plunger-head for supporting a gromet, a lever-arm connected with said die-carrier, a driving-shaft, a cam-member provided with a circumferential cam-portion adapted to operatively engage the free end of said lever-arm, a pivoted lever-member, one end of said pivoted lever-member being operatively connected with said plunger, a lateral cam-portion connected with said cam-member of said driving-shaft adapted to operatively engage the opposite end of said lever-member, said lateral cam-portion of said cam-member being so positioned with relation to said circumferential cam-portion of said cam-member that the former operates in advance of the latter, and means for automatically limiting the driven rotation of said driving-shaft to one revolution at a time.

17. In a device of the kind described, a frame-work, a pair of oppositely facing die-heads, one of said die-heads being secured to said frame-work in a fixed position, the other of said die-heads being adjustable upon said frame-work with reference to its distance from the said fixed die-head, means connected with said adjustable die-head for imparting thereto a limited backward and forward movement after the same has been secured in its primarily adjusted position, a gromet inserting mechanism connected with each die-head, a tube crimping mechanism connected with each die-head, and power transmission mechanism for operating both said gromet inserting mechanism and said tube crimping mechanism.

18. In a device of the kind described, a frame-work, a pair of oppositely facing die-heads, one of said die-heads being secured to said frame-work in a fixed position, the other of said die-heads being adjustable upon said frame-work with reference to its distance from said fixed die-head, means connected with said adjustable die-head for imparting thereto a limited backward and forward movement after the same has been secured in its primarily adjusted position, a gromet inserting mechanism connected with each die-head, a tube crimping mechanism connected with each die-head, a driving-shaft, cam-members mounted upon said driving-shaft, said cam-members each being provided with a circumferential cam-portion and a lateral cam-portion, operating means connected with said tube crimping mechanism adapted to be operatively engaged by said circumferential cam-portions, and operating means connected with said gromet inserting mechanism adapted to be operatively engaged by said lateral cam-portion.

19. In a device of the kind described, a frame-work, a pair of oppositely facing die-heads, one of said die-heads being secured to said frame-work in a fixed position, the other of said die-heads being adjustable upon said frame-work with reference to its distance from said fixed die-head, means connected with said adjustable die-head for imparting thereto a limited backward and forward movement after the same has been secured in its primarily adjusted position, a gromet inserting mechanism connected with each die-head, a tube crimping mechanism connected with each die-head, a driving-shaft, cam-members mounted upon said driving-shaft, said cam-members each being provided with a circumferential cam-portion and a lateral cam-portion, operating means connected with said tube crimping mechanism adapted to be operatively engaged by said circumferential cam-portions, and operating means connected with said gromet inserting mechanism adapted to be operatively engaged by said lateral cam-portion, said lateral cam-portion being so positioned with relation to said circumferential cam-portion that the former operates said gromet inserting mechanism in advance of the operation of said tube-crimping mechanism by the latter.

20. In a device of the kind described, a frame-work, a pair of oppositely facing die-heads, one of said die-heads being secured to said frame-work in a fixed position, the other of said die-heads being adjustable upon said frame-work with reference to its distance from said fixed die-head, means connected with said adjustable die-head for imparting thereto a limited backward and forward movement after the same has been secured in its primarily adjusted position, a gromet inserting mechanism connected with each die-head, a tube crimping mechanism connected with each die-head, a driving-shaft, cam-members mounted upon said driving-shaft, said cam-members each being provided with a circumferential cam-portion and a lateral cam-portion, operating means connected with said tube crimping mechanism adapted to be operatively engaged by said circumferential cam-portions, and operating means connected with said gromet inserting mechanism adapted to be operatively engaged by said lateral cam-portion, said lateral cam-portion being so positioned with relation to said circumferential cam-portion that the former operates said gromet inserting mechanism in advance of the operation of said tube-crimping mechanism by the latter, and means for automatically limiting the driven rotation of said driving shaft to one revolution at a time.

21. In a device of the kind described, a frame-work, a pair of oppositely facing die-heads, one of said die-heads being secured to said frame-work in a fixed position, the other of said die-heads being adjustable upon said frame-work with reference to its distance from said fixed die-head, means connected with said adjustable die-head for imparting thereto a limited backward and forward movement after the same has been secured in its primarily adjusted position, a gromet inserting mechanism connected with each die-head, a tube crimping mechanism connected with each die-head, a driving-shaft, a cam-member mounted upon said driving-shaft, said cam-members each being provided with a circumferential cam-portion and a lateral cam-portion, operating means connected with said tube crimping mechanism adapted to be operatively engaged by said circumferential cam-portions, and operating means connected with said gromet inserting mechanism adapted to be operatively engaged by said lateral cam-portion, said lateral cam-portion being so positioned with relation to said circumferential cam-portion that the former operates said gromet inserting mechanism in advance of the operation of said tube-crimping mechanism by the latter, and means for automatically limiting the driven rotation of said driving shaft to one revolution at a time.

22. In a device of the class described, a die-head, a crimping die mechanism mounted in said die-head, a driving shaft, transmission mechanism between said driving shaft and said crimping die mechanism for operating the latter, means for inserting a gromet in a tube, and means for automatically limiting the driven rotation of said driving shaft to one revolution at a time, comprising a driving pulley loosely mounted upon said driving-shaft and provided with an internal key-way, an oscillating-key connected with said driving-shaft, means tending to impel said oscillating-key into said key-way, a lever connected with one end of said oscillating key, a stop-bolt, means for mounting said stop-bolt normally in the path of said lever whereby when the latter engages the former it will oscillate said oscillating-key to withdraw the same from said key-way of said driving-pulley, a cam-plate adapted to withdraw said stop-bolt, a foot-treadle means connected with said cam-plate for operating said cam-plate, and a friction brake means adapted to overcome the momentum of said driving-shaft.

23. In a device of the kind described, a frame-work, a pair of oppositely facing die-heads, one of said die-heads being secured to said frame-work in a fixed position, the other of said die-heads being adjustable upon said frame-work with reference to its distance from said fixed die-head, and means connected with said adjustable die-head for imparting thereto a limited backward and forward movement after the same has been secured in its primarily adjusted position, comprising an anchor-block adjustably related to said frame-work, means for locking said anchor-block in its adjusted position, a stud projecting from one side of said anchor-block, a transverse shaft mounted in said movable die-head, a hand-lever connected with one end of said shaft, a crank-arm connected with the other end of said shaft, a stud connected with said crank-arm, and an inter-connecting link-member pivotally connected by its respective ends to said anchor-block stud and to said crank-arm stud.

In testimony, that I claim the invention set forth above I have hereunto set my hand this 6th day of November, 1913.

JOHN C. BLEVNEY.

Witnesses:
GEORGE D. RICHARDS,
FRED'K N. W. FRAENTZEL.

Copies of this patent may be obtained for five cents each, by addressing the "Commissioner of Patents, Washington, D. C."